Figure 1:

Patented Oct. 27, 1953

2,657,180

UNITED STATES PATENT OFFICE 2,657,180

MANUFACTURE OF ANTIFRICTION BEARING GREASES

Lorne W. Sproule and John S. Gray, Sarnia, Ontario, Canada, assignors to Standard Oil Development Company, a corporation of Delaware Application September 1, 1950, Serial No. 182,708

9 Claims. (Cl. 252—42)

The present invention relates to an improved process for the manufacture of anti-friction bearing greases and to the product of such a process. In particular, it relates to the production of smooth short fibre soda base greases having superior properties for the lubrication of anti-friction bearings which are subject to high temperature operation. The invention relates also to an improved grease, the product of such process having superior properties for lubricating problems that have been difficult to meet in the past.

Soda base greases, i. e., greases made by thickening lubricating oil with soda soaps of fatty acids and/or animal fats, and the like, have been known for many years. They have been recognized as having superior high temperature properties when compared with greases of calcium and aluminum base although they have certain deficiencies such as poor resistance to moisture.

Because of their high temperature properties, the soda greases are usually preferred for service in ball bearings, roller bearings, and the like, where temperatures above or approaching the boiling point of water (212° F.) are likely to be encountered. Such temperatures are frequently encountered in various types of machinery, for example, in automotive wheels which are contiguous to brakes which are apt to attain rather high temperatures. High temperatures may be encountered also in electric motors and generators as well as in numerous other types of industrial machinery.

While the high temperature properties of soda base greases have long been recognized, such greases are highly fibrous in character, as usually manufactured. For some purposes, a fibrous or spongy grease is desirable, but for anti-friction bearing lubrication fibrous greases are frequently deficient to a serious extent. They tend to cling to rotating shafts, and the like, and may be drawn so completely out of the bearings as to cause bearing failure due to absence of lubricant. Numerous suggestions have been made in the prior art for the modification of the fibrous character of soda greases. Thus, it has been suggested that modifiers, such as naphthenic acids, wool grease, Montan wax, and other materials, might be used to reduce the fibre. It has also been suggested that mechanical milling will reduce the fibre to some extent.

While some of the expedients mentioned above have been successful to a limited degree, the commercial production of an anti-friction bearing grease of soda base, a wheel bearing grease for example, with all the desirable properties which are needed for such service has not been fully accomplished in the past. It is an object of the present invention to improve the processes for production of soda base greases. A further object is to improve the composition of the grease itself so that it may fulfill all requirements for wheel bearing lubrication and analogous service.

The present invention is based upon the discovery that a superior soda base grease for ball and roller bearings, especially automotive wheel bearings, and the like, may be produced by introducing certain innovations into the processing and also by the choice of the ingredients and the manner in which they are combined. In substance, the improvements which combine to produce a superior product may be tabulated as follows:

(1) Choice of fatty material to control the iodine number. Fats and fatty acids of relatively low unsaturation, i. e., of iodine number below about 25, are required. With commonly available commercial fats of relatively high iodine number (approximately 45), the soda grease is highly fibrous, regardless of cooking and cooling procedures. A quantity of saturated or substantially saturated fatty acid is added to the commonly used natural fats to bring the iodine number down to the required level. An iodine number as low as 20, or even lower, is preferred.

(2) The careful and accurate control of cooking and withdrawing temperatures, preferably by the use of steam jacketed kettles.

(3) The preparation of a soap concentrate, predominantly of saturated acids as distinguished from fats, using a relatively small amount of lubricating oil to prepare the concentrate.

(4) Working additional oil into the soap concentrate under controlled temperature conditions, accompanied by cooling and continuous shearing or mechanical working of the product to break down fibre length, cooling being prolonged until the temperature reaches a maximum of about 130° F., preferably 110° to 120° F.

(5) The introduction of glycerine after cooking, i. e., during the working and cooling process, to modify the characteristics of the grease. This is to be distinguished from the common practice in the prior art of using glycerides rather than fatty acids to make certain types of greases.

At least some and perhaps all of the respective individual features just listed have been known in the prior art, or at least closely analogous practices have been known. The present invention, however, is based upon the discovery of the efficacy of the combination of the above factors which make the difference between a fibrous or spongy grease of relatively tough or stringy consistency and a smooth grease of very short fibre which is also suitable for the long life lubrication of ball bearings, roller bearings and analogous equipment. This is of great importance where the lubricant is subjected to severe shear rates and also may be subjected to high temperatures.

As indicated above, it has been found that lubricating greases for automotive vehicles, and the like, should have a short fibre for the most satisfactory service. This is true particularly under conditions of heavy duty operation. The long fibered greases, produced by conventional processing of soda base greases, tend to work out of the bearings and provide inadequate lubrication. Conventional soda soap greases have usually been made from natural fats such as tallow which has an iodine number of about 50. These products are long fibered in character. A study of the properties of soda base greases made from fats having different degrees of saturation, as indicated by iodine number, shows that greases made from the fats and fatty acids having an iodine number as low as 20 or less produce the usual type of fibrous grease when withdrawn from the cooking kettle at the customary drawing temperature of about 180° to 200° F. It has been discovered in the present invention, however, that when the latter grease is cooled to a much lower temperature with continued mechanical working or stirring, the long, tough fibres tend to break down to a short fibered or smooth, unctuous product. This is not true of greases of iodine number 45 to 50, for example. Preferably, cooling and working are continued until a temperature of about 110° to 130° F. is reached.

As indicated above, soda base greases may be made either from fatty acids or from the naturally occurring fats or glycerides. This has long been known in the art. It is also known that glycerine may be added to greases. According to the present invention, however, it has been found that far better control in plant scale manufacture, as regards the fibrous character of the grease, can be realized if the components of fat, i. e., fatty acid and glycerine, rather than the natural fats themselves, are introduced at appropriate stages in the process. Thus, it is preferable to use at least a substantial proportion of stearic acid or closely related and substantially saturated acids, along with natural fats of higher iodine number than about 25, in forming the soap concentrate, followed by the addition of glycerol later in the process. The glycerol is added in proportions roughly equivalent to that required for complete esterification of the separately introduced fatty acid. Preferably, the glycerol is added during cooling and while additional lubricating oil is being worked into the soap concentrate. The invention will be more fully understood by reference to the following specific example.

EXAMPLE I

|   | Per cent by weight |
|---|---|
| Stearic acid | 10.2 |
| Glycerol | 1.0 |
| Tallow | 6.8 |
| Sodium hydroxide | 3.1 |
| Pale mineral oil (v./100° F.–300, V. I. 45) | 43.5 |
| Mineral oil (v./210° F.–195, V. I. 75) | 35.4 |

*Inspections*

| Worked penetration | 287 |
|---|---|
| Dropping point, ° F | 350 |

*Mineral oil*

| V./210° F | 76 |
|---|---|
| U. S. Army wheel bearing test | Pass |

The process of manufacture as applied to the above formula consisted of combining the stearic acid with tallow and a quantity of the less viscous mineral oil substantially equivalent to the weight of fatty materials in a steam jacketed grease kettle. The soap stock (stearic acid and tallow) had a combined iodine number of about 20. These materials were combined and stirred while heating them to about 200° F. Caustic soda was next added in a 50 Bé. solution and the soap resulting therefrom was dehydrated by cooking at a temperature of about 300° F. Cooking was continued long enough to substantially complete the dehydration and thereafter the glycerol was gradually added along with the remainder of the lubricating oil. The cooking temperature during and after addition of the glycerol should, of course, be well below the boiling point of the glycerol. The rate of adding the glycerol and the additional lubricating oil was so regulated with respect to the heat content of the kettle that all of the oil had been introduced into the soap concentrate when a temperature of about 200° F. was reached.

Figure 2:
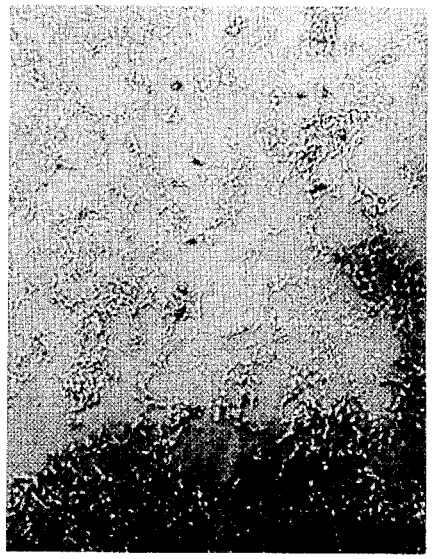

At the stage just described, where all of the oil had been worked into the soap concentrate and temperature had been dropped only to 200° F., the grease product was a tough long-fibered material typical of soda base grease. A sample was withdrawn at this stage for test. The bulk of the grease, however, was kept in the kettle. The steam in the jacket of the steam kettle was vented and cold water was run into the jacket. In Example I, the mixing was continued during the cooling operation and it was noted that as the temperature reached about 130° F. the fibre of the grease broke down rapidly and the lubricant became very smooth in appearance. The grease sample mentioned above, drawn at a temperature of 200° F., was exceedingly fibrous and stringy. The comparison with the final product is shown graphically in Figures 1 and 2 of the drawing. These photographs are magnified to the same scale of approximately 250 times. Figure 1 shows a stringy product prepared in the conventional manner. Figure 2, representing the product of this invention, is characterized by the absence of long strings. Both have an inner network of finer structure. The product of Example I has been introduced recently into commercial manufacture and has showed excellent service in the lubrication of automotive equipment.

EXAMPLE II

By way of contrast, a grease was prepared using straight tallow of iodine number 50. Its formula was as follows:

|   | Per cent by weight |
|---|---|
| Tallow (50 iodine number) | 13.4 |
| NaOH | 2.3 |
| Mineral oil, 300 S. S. U. at 100, V. I. 70 | 49.4 |
| Mineral oil, 195 S. S. U. at 100, V. I. 75 | 34.9 |

The finished grease had a worked penetration of 228 mm./10. The mineral lubricating oil had an average viscosity index of 74. This composition was prepared as follows:

The tallow was added to approximately an equal weight of the lighter mineral oil in a steam jacketed kettle. These ingredients were stirred together as the temperature was raised to about 150° F. At this point, the sodium hydroxide was added as a 50 Bé. solution. After thorough mixing, more steam was introduced to bring the temperature gradually up to 300° F. At this point, the additional mineral oils were added to the soap at such a rate that the temperature had declined to about 200° F. when all the oils were added.

A sample of the grease was taken from the mixer at 200° F. and the remainder was mixed continuously until the temperature had dropped to 110° F. Thus, the processing, in general, was the same as in Example I.

Figure 3:
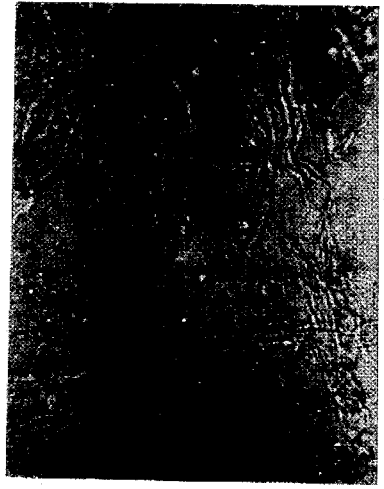
Figure 4:
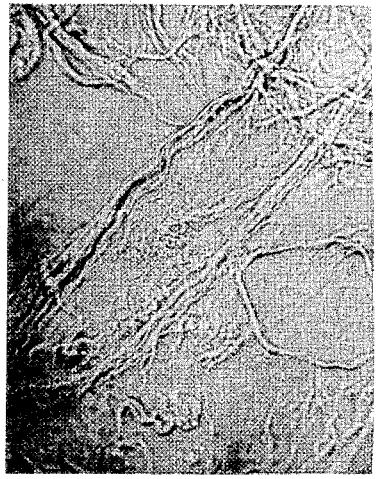

The sample withdrawn at 200° F. was stringy and fibrous. A photomicrograph of the same magnification as Figures 1 and 2 is shown in Figure 3. The final product, withdrawn from the kettle after cooling to 110° F., was just as stringy and fibrous as that drawn at 200° F. A photomicrograph is shown in Figure 4.

Comparison of the figures of the drawing shows clearly the comparative fiber characteristics of Example I, when cooled to a relatively low temperature. The low iodine number product, especially when the fatty acids are used first and the normal glycerin content is added later, provide an excellent product when cooled to a temperature of the general range of 100° to 130° F. before withdrawing from the kettle (Figure 2). With fatty materials of high iodine number, the additional kettle working and cooling is inadequate to give the required short fibre.

While specific proportions have been given in Example I, it will be understood that these may be varied rather widely without departing from the spirit of the invention. Manufacturing conditions also may be varied within reasonable limits. In general, the total proportions of fatty materials used will range between 5 and 30% by weight of the total ingredients. These should have an average iodine number not greater than 25, preferably about 20. At the outset, it is preferred that the fatty materials be comparatively free of glycerin (fatty acids) but mixtures of acids and natural fats may be used. Preferably, the total glycerin content of the fatty materials is less than half that of corresponding glycerides. This is made up fairly or substantially completely by the later addition of glycerin, but the overall glycerin content, considering all ingredients introduced, may range between about 0.8 and 1.5 times the theoretical natural glycerin content of natural fats (triglycerides) for most purposes. In Example I, the glycerin added was equal to about 10% of the stearic acid. This is about 1.2 times the theoretical triglyceride content of glycerin.

As saponifying agent, sodium hydroxide of commercial grade is preferred in quantities fairly close to theoretical. Acidity of the final product should be avoided. A small amount of alkalinity usually is not objectionable.

The lubricating oils used for anti-friction bearing service are preferably mineral oils of viscosity between about 35 and 500 S. S. U. at 210° F. For lubrication over widely varying temperatures, fairly high viscosity indices, preferably above 70, are desired. Oils other than those of mineral base, e. g., synthetic oils such as dibasic acid esters, polyglycol ethers, etc., may be added after the soap concentrate is formed. In all cases, the soap concentrate should be made with mineral oil or with an oil which is chemically inert in order to avoid the undesirable side reactions which usually occur in the case of soap formation in the presence of synthetic lubricants. Subject to this limitation, the dibasic acid esters, polyglycols, glycol ethers, and the like, can be substituted wholly or in part for the oil which is added after the soap concentration is prepared.

The usual modifiers, such as antioxidants, extreme pressure additives, metal deactivators, and the like, may be incorporated in the usual proportions as will be obvious to those skilled in the art. Ordinarily, a small amount of antioxidant will be used if the grease is intended for long life service, e. g., in bearings lubricated for life. Otherwise, the product is usually quite satisfactory without inhibitors or additives of any kind.

What is claimed is:

1. A lubricating grease composition comprising lubricating oil having a viscosity between about 35 and 500 S. S. U. at 210° F., thickened to a grease consistency with a soda soap of a mixture of commercial fats and substantially saturated fatty acids, said mixture having an iodine number not greater than about 25 and being substantially free of uncombined glycerin prior to saponification, said grease being characterized by a smooth structure and short fibre imparted thereto by cooling with mechanical working to a temperature not greater than 130° F. and by introducing extraneous glycerin during such cooling and working sufficient in amount to make the total glycerin content equal to about 0.8 to about 1.5 times that of said fats and the corresponding triglycerides of said fatty acids.

2. Composition according to claim 1 wherein the soap content is between 10 and 20% by weight, based on the weight of the total composition.

3. Process of preparing smooth short fibered soda base lubricating grease which comprises combining a mixture of commercial fats and substantially saturated fatty acids, said mixture being substantially free of uncombined glycerin and having an iodine number not greater than about 25 with a comparatively small quantity of mineral base lubricating oil, saponifying the fats and fatty acids with a soda base, cooking to substantially dehydrate at a temperature between 250° and 400° F., thereafter cooling while introducing additional lubricating oil and a sufficient quantity of extraneous glycerin to maintain a total amount of glycerin therein corresponding approximately to that required to form said fats and the triglycerides of said fatty acids, while continuously working, completing the introduction of additional oil as the temperature is lowered to about 180° to 200° F., and further cooling with continued mechanical working to a temperature below 130° F. to break down the normal fibre of soda grease.

4. The process of preparing lubricating grease according to claim 3 wherein the quantity of glycerin introduced along with the additional lubricating oil is sufficient to maintain the total glycerin content between 0.8 and 1.5 times the theoretical quantity required to convert the total fatty material present to the corresponding triglyceride.

5. The process of preparing soda base lubricating greases for automotive wheel bearings, and the like, which comprises preparing a soap concentrate in mineral lubricating oil of a combination of natural fats and fatty acid of the $C_{12}$ to $C_{22}$ range, said combined fats and fatty acid having a combined iodine number of about 20 and being substantially devoid of uncombined glycerin, cooking the soap concentrate so formed to a temperature of approximately 300° F. until the concentrate is substantially dehydrated, introducing additional lubricating oil and a quantity of extraneous glycerin approximately equal to that required to completely esterify said fatty acid to a triglyceride while controlling the temperature as the concentrate is cooled from cooking temperature down to about 180° to 200° F., and thereafter further cooling with continued mechanical working to a final temperature between 100° and 130° F.

6. Process according to claim 5 wherein the natural fat is commercial tallow and the fatty acid is predominantly stearic acid.

7. A lubricating grease composition consisting essentially of lubricating oil of 35 to 500 S. S. U. viscosity at 210° F., thickened to a grease consistency with about 10 to 30% by weight, based on the total composition, of a soda soap of combined natural fats and fatty acids of the $C_{12}$ to $C_{22}$ range, and of average iodine number below about 25, said soap being prepared by saponification in a small portion of mineral lubricating oil of a mixture of the fats and fatty acids originally substantially free of uncombined glycerin at a cooking temperature of 250° to 400° F., followed by cooling and introduction of additional oil and introduction of sufficient extraneous glycerin to maintain a total glycerin content of 0.8 to 1.5 times the quantity required to form said fats and the triglycerides of said fatty acids, said grease having a short fibrous structure modified by continued working while cooling down to a temperature not greater than 130° F.

8. Composition according to claim 7 wherein said natural fat is commercial tallow and said fatty acid is predominantly stearic acid.

9. Composition according to claim 7 wherein said lubricating oil is mineral lubricating oil.

LORNE W. SPROULE.
JOHN S. GRAY.

References Cited in the file of this patent

UNITED STATES PATENTS

| Number | Name | Date |
| --- | --- | --- |
| 2,038,688 | Taylor | Apr. 28, 1936 |
| 2,070,014 | Lincoln et al. | Feb. 9, 1937 |
| 2,144,077 | Murphree et al. | Jan. 17, 1939 |
| 2,186,514 | Yagle | Jan. 9, 1940 |
| 2,255,278 | Brunstrum | Sept. 9, 1941 |
| 2,265,791 | Zimmer et al. | Dec. 9, 1941 |
| 2,449,312 | Murray | Sept. 14, 1948 |
| 2,487,081 | Swenson | Nov. 8, 1949 |
| 2,514,286 | Morway et al. | July 4, 1950 |
| 2,527,789 | Bondi | Oct. 31, 1950 |
| 2,588,326 | Ogden et al. | Mar. 4, 1952 |